US012801756B2

(12) United States Patent
Guo et al.

(10) Patent No.: US 12,801,756 B2
(45) Date of Patent: Nov. 17, 2026

(54) METHOD, APPARATUS AND DEVICE FOR HARDENING ASSETS IN OT SYSTEM AND STORAGE MEDIUM AND COMPUTER PROGRAM PRODUCT

(71) Applicant: Siemens Aktiengesellschaft, Munich (DE)

(72) Inventors: Dai Fei Guo, Beijing (CN); Li Juan Zhao, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 17 days.

(21) Appl. No.: 18/860,848

(22) PCT Filed: Apr. 29, 2022

(86) PCT No.: PCT/CN2022/090640
§ 371 (c)(1),
(2) Date: Oct. 28, 2024

(87) PCT Pub. No.: WO2023/206521
PCT Pub. Date: Nov. 2, 2023

(65) Prior Publication Data
US 2025/0291935 A1 Sep. 18, 2025

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS 6,044,461 A 3/2000 Agha
2014/0137257 A1* 5/2014 Martinez ............ H04L 63/1433 726/25
(Continued)

FOREIGN PATENT DOCUMENTS

CN 110383249 A 10/2019
CN 112291232 B 6/2021 ......... G06F 16/2458
(Continued)

OTHER PUBLICATIONS

Extended European Search Report, Application No. 22939368.1, 13 pages, Nov. 5, 2025
(Continued)

*Primary Examiner* — Younes Naji
(74) *Attorney, Agent, or Firm* — Slayden Grubert Beard PLLC

(57) ABSTRACT

Various embodiments of the teachings herein include method for hardening assets in OT system. An example includes: collecting communication traffic among the assets to identify instruction property; determining a status property of the assets according to configuration file of the assets; determining roles of the assets according to the identified instruction property and the status property of the assets; determining asset work modes according to the identified instruction property from communication traffic among the assets; calculating an asset criticality score in a time frame according to the determined asset work mode and the assets roles; and conducting a hardening plan based on the asset criticality score and an asset impact score of hardening the assets for production without affecting the production of the assets in the OT system.

17 Claims, 4 Drawing Sheets

(56) References Cited

U.S. PATENT DOCUMENTS

| | | | | |
|---|---|---|---|---|
| 2017/0017549 | A1* | 1/2017 | Fukuzumi | G06F 11/0757 |
| 2018/0136921 | A1* | 5/2018 | Pfleger de Aguiar | G06N 7/01 |
| 2019/0155838 | A1* | 5/2019 | Friedmann | G03B 17/48 |
| 2020/0404502 | A1* | 12/2020 | Trivellato | H04L 63/1458 |
| 2022/0129560 | A1* | 4/2022 | Bulut | G06N 3/091 |
| 2023/0315864 | A1* | 10/2023 | Zhen | G06F 21/577 726/25 |

FOREIGN PATENT DOCUMENTS

| | | | | |
|---|---|---|---|---|
| EP | 1300761 | A1 | 4/2003 | |
| EP | 3139318 | A1 | 3/2017 | G06F 21/57 |
| JP | 2008204208 | A | 9/2008 | G06F 11/00 |
| WO | 2019207729 | A1 | 10/2019 | |
| WO | 2020/263522 | A1 | 12/2020 | G06F 21/55 |
| WO | 2021072742 | A1 | 4/2021 | |

OTHER PUBLICATIONS

Search Report for International Application No. PCT/CN2022/090640, 11 pages, Dec. 21, 2022.

* cited by examiner

METHOD, APPARATUS AND DEVICE FOR HARDENING ASSETS IN OT SYSTEM AND STORAGE MEDIUM AND COMPUTER PROGRAM PRODUCT

CROSS-REFERENCE TO RELATED APPLICATIONS

This application is a U.S. National Stage Application of International Application No. PCT/CN2022/090640 filed Apr. 29, 2022, which designates the United States of America, the contents of which are hereby incorporated by reference in their entirety.

TECHNICAL FIELD

The present disclosure relates to industrial networks and operational technology (OT). Various embodiments of the teachings herein include methods and/or devices for hardening assets in OT system.

BACKGROUND

In recent years, it is common to use Internet-connected smart and IoT devices for remote monitoring and management in industrial control systems (ICS). That is, the majority of ICS in operation technology (OT) today connect directly or indirectly to the other system via the ethernet. This introduces them to vulnerabilities like any other interconnected system. Many of these systems monitor and control complex industrial processes and critical infrastructures that provide electricity, petroleum production, water transportation, manufacturing, communications, and other essential services. The downtime or infiltration of an ICS network could result in massive outages, hundreds of thousands of impacted users, and even national disasters.

ICS assets are the digital devices that are used in industrial processes. This includes all the various components of critical infrastructure. There are some measures to mitigate the security of the ICS assets, for instance, performing network risk segmentation, implementing least privilege, securing remote access, etc. This also includes the device hardening, for example, updating and patching the assets as soon as possible. But it is not realistic to fix all security vulnerabilities immediately. Considering that it takes a long time to prepare and test the upgrade or change of the industrial control system, which requires high personnel capabilities and the impact on continuous production. At present, many adopt a conservative attitude towards vulnerability fixes, causes these problems to be hidden in systems. Once used by an attacker, it may cause unpredictable impact and loss. System hardening aims to reduce this kind of attack surface as small as possible, making it difficult for malicious actors to compromise the asset.

SUMMARY

To improve the efficiency of the system hardening and reduce the impact on the operation of OT system, it may be necessary to identify and rank the critical status of the assets in the industrial control system, generate a hardening plan automatically to mitigate the security risk of assets without affecting the critical production process. For example, some embodiments include a method for hardening assets comprising: collecting communication traffic among the assets to identify instruction property; determining a status property of the assets according to configuration file of the assets;

determining the assets roles according to the identified instruction property and the status property of the assets; asset work modes according to the identified determining instruction property from communication traffic among the assets; calculating an asset criticality score in a time frame according to the determined asset work mode and the assets role; and conducting a hardening plan based on the asset criticality score and an asset impact score of hardening the assets for production without affecting the production of the assets in the OT system. The methods can automatically harden the assets without affecting the production.

In some embodiments, the method includes calculating the asset impact score of hardening the assets for production based on whether hardening the assets needs to restart the assets' operating system.

In some embodiments, calculating the asset impact score of hardening the assets for production based on duration of hardening the assets.

In some embodiments, calculating available hardening time based on the duration of hardening the assets, and based on the asset criticality score, and hardening the assets at the available hardening time.

In some embodiments, determining whether the assets are abnormal based on monitoring at least one of a CPU state, a memory occupancy state, and a communication state of the assets after hardening the assets, modifying the asset impact score of hardening the assets for production in response to the assets being abnormal, and generating a modified hardening plan.

In some embodiments, the hardening includes update of the program in the assets, update of the security policy of the password of the assets, account management of the assets, and port management of the assets.

In some embodiments, the asset is an OT asset; and the OT assets are computer hardware, computer software, or a combination of both.

BRIEF DESCRIPTION OF THE DRAWINGS

The above-mentioned attributes and other features and advantages of the teachings of the present disclosure and the manner of attaining them will become more apparent and the present technique itself will be better understood by reference to the following description of embodiments of the present technique taken in conjunction with the accompanying drawings, wherein.

REFERENCE NUMBERS

Figure 1:
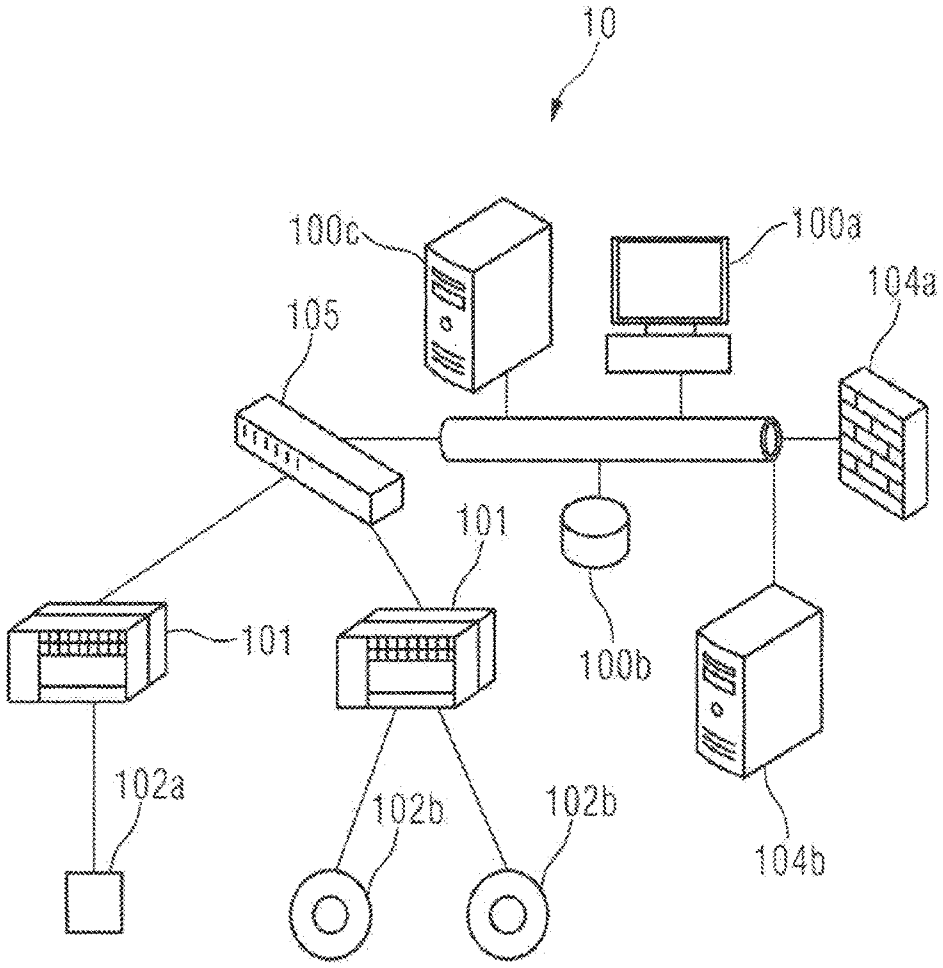
FIG. 1 is a schematic diagram of OT system incorporating teachings of the present disclosure.

10 OT system
101 industrial controller
102*a* sensor
102*b* motor
100*a* engineer station
100*b* database server
100*c* application server
104*a* firewall
104*b* server for intrusion detection
105 network switching and routing device S202-S214 steps
300 apparatus
302 collection module
304 first determination module
306 second determination module
308 third determination module
310 calculation module
312 conduction module
400 computer device
402 memory
404 processor

DETAILED DESCRIPTION

In order to make the technical solutions and advantages of the invention clearer, the teachings of the present disclosure are further described in detail below with reference to the accompanying drawings and embodiments. The specific embodiments described herein are only used to illustrate the teachings and are not configured to limit the protection scope of the disclosure.

Currently, after assessing the system, the organization is only informed there are some assets that need hardening. But it is not realistic to stop the whole system to deploy the hardening measurement because it may impact the critical production process that may cause a disaster. To apply the hardening measurement for the OT system as soon as possible, it is needed to identify the criticality of the asset's role based on the instruction and work mode, and then combine the instruction, the work mode, the hardening time needed and the hardening operation impact to formulate a hardened strategy. Therefore, here provide a method of automatic hardening based on operation impact analysis in OT environment to identify the hardening time slot accordingly.

Introduction of OT System

An OT system, also referred to as an Industrial Control System (ICS), is configured to implement automatic control of industrial processes. An OT system can be a wind power system, a car manufacturing plant, a pharmaceutical factory, a municipal sewage treatment system, and the like.

OT utilizes hardware and software to achieve detection or control by directly monitoring and/or controlling physical devices, processes and events in an enterprise. An OT system uses a computer to monitor or change the physical state of a system. Examples of an OT system include: supervisory control and data acquisition (SCADA) system, distributed control system (DCS), computer numerical control (CNC) system (including computerized mechanical tools), and scientific equipment (such as digital oscilloscopes).

FIG. 1 is a schematic diagram of an example OT system incorporating teachings of the present disclosure. As shown in FIG. 1, the OT system 10 may comprise: industrial controller 101, field device 102*a*, 102*b*, industrial host 100*a*, 100*b*, 100*c*, security device 104*a*, 104*b* and network switching and routing device 105. The industrial controller 101 coupled to field device 102*a*, 102*b*, and the industrial controller 101 coupled to the industrial host 100*a*, 100*b*, 100*c* by network switching and routing device 105. The industrial controller 101 also coupled to the industrial host 100*a*, 100*b*, 100*c* by security device 104*a*, 104*b*; wherein the industrial controller 101 may comprise, but is not limited to, a programmable logic controller (PLC), and a programmable automation controller (PAC); wherein a field device may comprise such as a sensor 102*a*, and a motor 102*b*, wherein the sensor 102*a* may obtain field data such as temperature, humidity, pressure and liquid flow rate under the control of the industrial controller 101, and the motor 102*b* can drive motion under the control of the industrial controller 101; wherein an industrial host may comprise such as an engineer station (ES) 100*a*, an operator station (OS) 100*a*, a human machine interface (HMI), a database server 100*b*, and an application server 100*c*; wherein at least one security device may comprise such as a firewall 104*a*, and a server 104*b* for intrusion detection, wherein the security fire-protection device may comprise such as the firewall 104*a* and the server 104*b* for intrusion detection may also form an intrusion detection system (IDS) to implement intrusion detection of the OT system 10; wherein a network switching and routing device 105 may comprise such as an industrial switch and an industrial router, wherein these network switching and routing devices 105 may constitute an industrial Ethernet to interconnect the internal devices of the OT system 10. In this OT systems, assets could include the industrial controller 101, the field device 102*a*, 102*b*, the industrial host 100*a*, 100*b* and 100*c*, security device 104*a*, 104*b* and network switching and routing device 105.

A typical architecture of the OT system is described above as an example. Those skilled in the art may realize that the architecture of the OT system may be changed based on a specific application environment or deployment difference, and the embodiment of the invention is not limited hereto.

For example, a security software (it can also called as a security system) can be deployed in the security device 104*a*, 104*b* in OT system. The security software can also be implemented in computer hardware or the combination of software and hardware. Security software is used to monitor the assets in factories, as a result, understanding, managing, controlling, and mitigating risk of assets of organization (for example, owner of factory). Security software probes the assets actively and passively to identify the asset type, for example, firewall, switch, Programmable Logic Controllers (PLC), Remote Terminal Units (RTUs), Human-Machine Interfaces (HMIs), etc. Security software is used to monitor and analyze behavior by analyzing the network communication traffic among assets, identify the network behavior to identify the vulnerabilities of the assets, collect the security alert and event to the assets to calculate the likelihood of being attacked.

Figure 2:
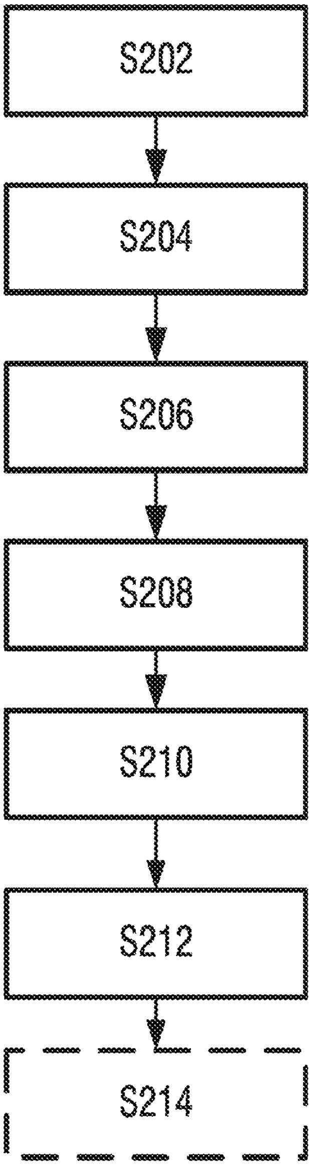
FIG. 2 is a flow chart of a method of hardening assets incorporating teachings of the present disclosure.

FIG. 2 is a flow chart of an example method of hardening assets incorporating teachings of the present disclosure.

In step S202, collecting communication traffic among the assets to identify instruction property. For example, the instruction property can indicate a behavior of the assets, for example, sending a controlling instruction, implementing a controlling instruction or collecting data instruction. The behavior of the assets can include a process in a host executed by a configuration file. In some embodiments, the method can also include determining instruction property of assets is based on a control field in communication traffic between the assets, wherein the instruction property indicates the instruction is a control instruction, an execution instruction, or a data instruction.

In step S204, determining a status property of the assets according to configuration file of the assets. The status property of the assets can include asset role, asset work mode or asset criticality score. For example, the asset roles can refer to operator station 100*a* that receive controlling instructions or engineer station 100*a* that send controlling instructions. The asset roles also can refer to PLC 101 or database server 100*b* etc. In summary, the asset role can define a function of an asset. That is, the asset role refer to an asset with a certain function.

The configuration file of the assets can refer to a software in the assets that are configured for implementing a function. For example, the configuration file of assets can instruct the device to monitoring a temperature in manufacture process.

In step S206, determining an asset's role according to the identified instruction property and the status property of the assets. The identified instruction property indicates, for example, network behavior of assets. The status property of the assets indicates, for example, character in a time frame.

The asset role, for example, can include the critical control asset, the critical non-control asset, the non-critical asset, monitoring asset, etc. In some embodiments, the method can determine the asset role by analyzing the critical instruction.

In step S208, determining an asset work mode according to the identified instruction property from communication traffic among the assets. For example, the asset work mode can include simulation mode, maintenance mode, implement mode. For example, the asset work mode of asset role can include a server that sending a controlling instruction in the implement mode, and a PLC that collecting data instruction in maintenance mode or in simulation mode.

In some embodiments, it can determine the asset work mode based on a configuration file of the asset and/or communication traffic among the assets.

In step S210, calculating an asset criticality score in a time frame according to the determined asset work mode and the assets role. The asset criticality score define influence of hardening the assets for production. For example, the asset criticality score is 5 based on that an asset is in implement mode time frame for the asset that is sending controlling instruction. For example, the asset criticality score is 4 based on that the asset is in implement mode time frame for the asset that is sending data instruction. For example, the asset criticality score is 3 based on that the asset is in simulation mode time frame for the asset that is sending data instruction. For example, the asset criticality score is 2 based on that the asset is in maintenance mode time frame for the asset that is sending controlling instruction. For example, the asset criticality score is 1 based on that the asset is in maintenance mode time frame for the asset that is sending data instruction. For example, the asset criticality score is 0 based on that the asset is in maintenance mode time frame for the asset that does not sending data.

In some embodiments, security software collects communication traffic among engineer station 100*a* and industry controller 101 to identify instruction property. Then, the software determines a status property of the industry controller 101 according to configuration file of the industry controller 101. Then, the software determines that the industry controller 101 send a controlling instruction according to the identified instruction property and the status property of the assets. Then, the software determines the industry controller 101 is in maintenance mode according to the identified instruction property from communication traffic among the assets. Then, the software calculates an asset criticality score as 2 score in a certain time frame to determine the software can harden the industry controller 101 in that time.

In step S212, conducting a hardening plan based on an asset criticality score and an impact score of hardening the assets for production without affecting the production of the assets in the OT system.

In some embodiments, the method further includes calculating the asset impact score of hardening the assets for production based on whether hardening the assets needs to restart the assets' operating system. For example, if the hardening to the assets does not impact the operation of the system, and the hardening duration is acceptable, it will be suggested to apply the hardening operation directly. If the hardening does not impact the operation of the system, or restarting the system after hardening is not necessary, it will find out the available non-critical process according to the hardening duration and recommend implementing the hardening measurement during this non-critical process time frame.

In some embodiments, the method further includes calculating the asset impact score of hardening the assets for production based on duration of hardening the assets. If the hardening impacts the operation of the system, or restarting the system after hardening is necessary, it will find out the available maintenance or non-producing time frame according to the hardened duration, it will launch harden during this maintenance or non-produce time frame.

In some embodiments, the method further includes calculating available hardening time based on the duration of hardening the assets, and based on the asset criticality score, and hardening the assets at the available hardening time.

In some embodiments, the hardening includes update of the program in the assets, update of the security policy of the password of the assets, account management of the assets, and port management of the assets.

In some embodiments, the asset is an OT asset; and the OT assets are computer hardware, computer software, or a combination of both.

In some embodiments, the method further includes determining whether the assets are in production based on a configuration file of the asset.

In step S214, determining whether the assets are abnormal based on monitoring a state of the operating system of the assets after hardening the assets, wherein monitoring a state of the operating system of the assets after hardening the assets includes at least one of a CPU state, a memory occupancy state, and a communication state, modifying the asset impact score of hardening the assets for production in response to the assets being abnormal, and generating a modified hardening plan.

In some embodiments, the security software calculates the asset impact score as 0 if the hardening to the assets does not impact the operation of the system, and the hardening duration is acceptable. The security software calculates the asset impact score as 1 if the hardening does not impact the operation of the system, or restarting the system after hardening is not necessary, it will find out the available non-critical process according to the hardening duration and recommend implementing the hardening measurement during this non-critical process time frame. The security software calculates the asset impact score as 2 if the hardening impacts the operation of the system, or restarting the system after hardening is necessary, it will find out the available maintenance or non-producing time frame according to the hardened duration, it will launch harden during this maintenance or non-produce time frame. Then, the security software determines whether the industry controller 101 is abnormal based on monitoring CPU state of the operating system of the industry controller 101 after hardening the industry controller 101, for example, the utilization ratio of CPU is significantly higher than normal utilization ration of CPU, then the security software modifies the asset impact score of the industry controller 101 and generates a modified hardening plan. For example, the security software can modify the asset impact score of the industry controller 101 from 2 score to 5 score. Then, the security software modifies the hardening plan, for example, the hardening the industry controller 101 could be conducted when the industry controller 101 is in maintenance mode.

The method may provide: this hardening system evaluate hardening priority and importance according to the asset operation behavior and configuration which are more meticulous and accurate to understand the asset role. Further, it identifies the time frame dimension of asset operation, for example the time frame of simulation, maintenance, and producing mode as a factor of calculating hardening priority. This can help the system find the proper hardening time slot to safely deploy the hardening measurement. Further, before implementing hardening, it considers the hardening impact and whether the restart is necessary, if the hardening operation may influence the production, it will match the actual available hardening time slot best based on the needed hardening duration. This help find the proper hardening time slot avoid impacting the operation of the target system. It automatically implements the most suitable hardening plan instead of just informing hardening is required. It implements automatic hardening without affecting the critical production process to ensure the most availability principle and fulfills the security requirements in OT.

Figure 3:
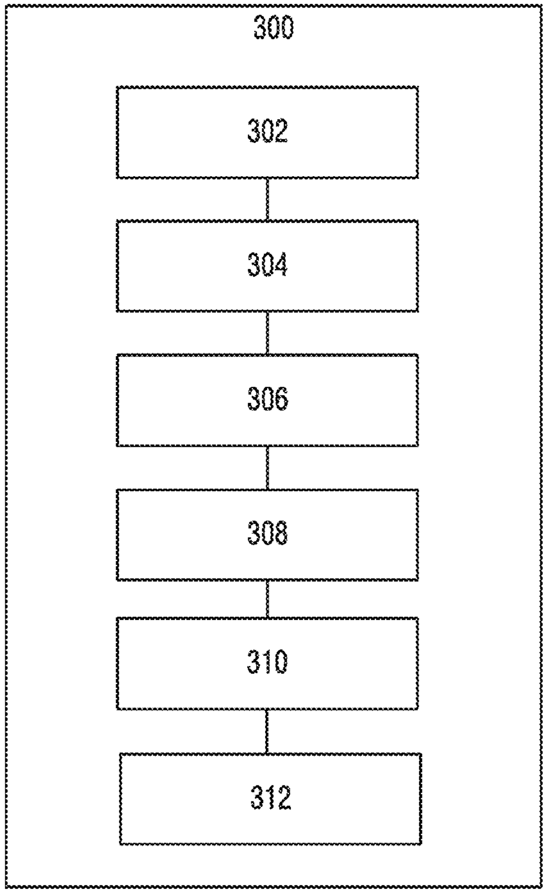
FIG. 3 is an apparatus of hardening the assets incorporating teachings of the present disclosure.

FIG. 3 is an apparatus 300 for hardening assets in OT system including collection module 302 for collecting communication traffic among the assets to identify instruction property; first determination module 304 for determining a status property of the assets according to configuration file of the assets; second determination module 306 for determining the assets roles according to the identified instruction property and the status property of the assets; third determination module 308 for determining an asset work modes according to the identified instruction property from communication traffic among the assets; calculation module 310 for calculating an asset criticality score in a time frame according to the determined asset work mode and the assets role; and conduction module 312 for conducting a hardening plan based on an asset criticality score and an asset impact score of hardening the assets for production without affecting the production of the assets in the OT system.

Figure 4:
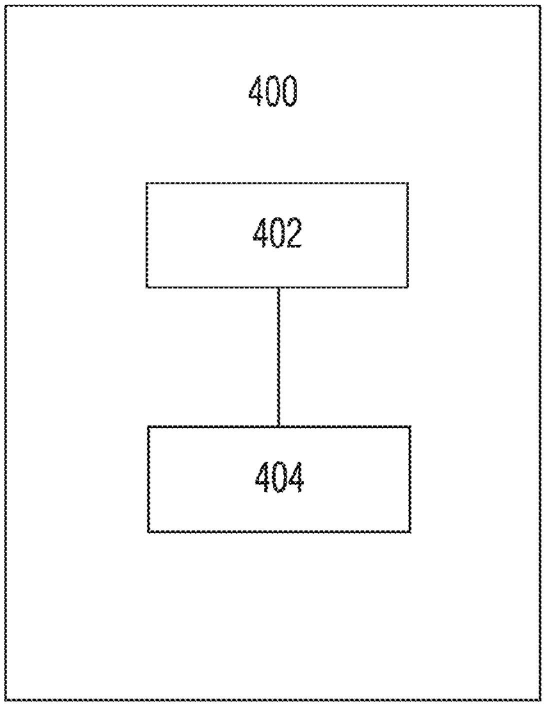
FIG. 4 is a computer device for hardening assets in OT system incorporating teachings of the present disclosure.

FIG. 4 is an example computer device 400 for hardening assets in OT system incorporating teachings of the present disclosure. The computer device comprises a memory 402 and a processor 404, wherein an application executable by the processor is stored in the memory 402 for causing the processor 404 to perform the method. Further, it also provides a computer-readable storage medium characterized in that computer-readable instructions are stored therein for performing the method.

Further, it also provides a computer program product is characterized in that the computer program product is tangibly stored on a computer-readable medium and includes computer-readable instructions that, when executed, cause at least one processor to perform the above steps in the method for hardening assets in OT system.

Not all the steps and modules in the above-mentioned processes and structure diagrams are required, and certain steps or modules may be omitted according to actual needs. The execution order of each step is not fixed and can be adjusted as needed. The division of each module is only functional division for ease of description. In some embodiments, one module can be divided into multiple modules, the functions of multiple modules can also be realized by one module, and these modules can be in the same device and can also be in different devices.

The hardware modules in various embodiments may be implemented mechanically or electronically. For example, a hardware module may comprise a specially designed permanent circuit or logic device (such as a dedicated processor, like an FPGA or ASIC) for performing certain operations. A hardware module may also comprise a programmable logic device or circuit temporarily configured by software (for example, comprising a general-purpose processor or other programmable processors) for performing certain operations. Whether to adopt a mechanical method, or a dedicated permanent circuit, or a temporarily configured circuit (for example, configured by software) for the hardware module can be decided based on cost and time considerations.

The teachings also provide a machine-readable storage medium storing instructions for causing a machine to perform the method as described herein. Specifically, a system or device equipped with a storage medium may be provided, a software program code for realizing the functions of any of the above embodiments is stored on the storage medium, and a computer (or CPU or MPU) of the system or device is made to read out and execute the program code stored in the storage medium. In addition, some or all of the actual operations may be performed by an operating system or the like operating on a computer based on instructions of the program code. The program code read out from the storage medium may also be written into a memory arranged in an expansion board inserted into the computer or written into a memory arranged in an expansion unit connected to the computer, and then some or all of the actual operations are executed by a CPU or the like installed on the expansion board or the expansion unit based on the instructions of the program code, so as to achieve the functions of any of the above-described embodiments.

The storage medium for providing the program code can be implemented as floppy disk, hard disk, magneto-optical disk, optical disk (such as CD-ROM, CD-R, CD-RW, DVD-ROM, DVD-RAM, DVD-RW, DVD+RW), magnetic tape, non-volatile memory card and ROM. In some embodiments, the program code may be downloaded from a server computer or cloud through a communication network.

The above description is only example embodiments of the teachings herein and is not intended to limit the protection scope of the disclosure. Any modification, equivalent replacement and improvement made within the spirit and principle of the disclosure shall fall within the protection scope thereof.

Not all the steps and modules in the above-mentioned processes and system structure diagrams are required, and certain steps or modules may be omitted according to actual needs. The execution order of each step is not fixed and can be adjusted as needed. The system structures described in the foregoing embodiments may be physical structures or logical structures, that is, some modules may be implemented by the same physical entity, or some modules may be implemented by multiple physical entities or may be implemented by certain components in multiple independent devices together.

In the above embodiments, a hardware unit may be implemented mechanically or electrically. For example, a hardware unit may comprise a permanent dedicated circuit or logic (such as a dedicated processor, like an FPGA or ASIC) for performing corresponding operations. A hardware unit may also comprise a programmable logic or circuit (such as a general-purpose processor or other programmable processors) which can be temporarily configured by software to perform corresponding operations. The specific implementation method (a mechanical method, or a dedicated permanent circuit, or a temporarily configured circuit) can be decided based on cost and time considerations.

The teachings have been illustrated and described in detail with reference to the accompanying drawings and example embodiments. However, the disclosure is not limited to these disclosed embodiments, and based on the above embodiments, those skilled in the art can understand that the code auditing means in the above different embodiments can be combined to obtain more embodiments, and these embodiments also fall within the protection scope of the disclosure.

What is claimed is:

1. A method for hardening assets in an operational technology (OT) system, the method comprising:
- collecting communication traffic among the assets to identify instruction property;
- determining a status property of the assets according to configuration file of the assets;
- determining roles of the assets according to the identified instruction property and the status property of the assets;
- determining an asset work mode according to the identified instruction property from communication traffic among the assets;
- calculating an asset criticality score in a time frame according to the determined asset work mode and the assets roles;
- conducting a hardening plan based on the asset criticality score and an asset impact score of hardening the assets for production without affecting the production of the assets in the OT system, wherein the hardening plan includes an update of a program in the assets, an update of a security policy of a password of the assets, an account management of the assets, and a port management of the assets;
- determining whether the assets are abnormal includes monitoring a CPU state, a memory occupancy state, and a communication state of the assets after hardening the assets; and
- in response to the assets being abnormal, modifying the asset impact score of hardening the assets for production.

2. The method according to the claim 1, further comprising:
- calculating the asset impact score of hardening the assets for production depends at least in part on whether hardening the assets requires a restart of an assets' operating system.

3. The method according to claim 1, further comprising: calculating the asset impact score of hardening the assets for production depends at least in part on a time required to harden the assets.

4. The method according to claim 1, further comprising:
- calculating available hardening time depends at least in part on a time required to harden the assets and the asset criticality score; and
- hardening the assets at the available hardening time.

5. The method according to claim 1, further comprising: generating a modified hardening plan.

6. The method according to claim 1, wherein:
- the asset are OT assets; and the OT assets are computer hardware, computer software, or a combination of both.

7. An apparatus for hardening assets in an operational technology (OT) system, the apparatus comprising:
- a collection hardware module to collect communication traffic among the assets to identify instruction property;
- a first determination hardware module to determine a status property of the assets according to configuration file of the assets;
- a second determination hardware module to determine roles for each of the assets according to the identified instruction property and the status property of the assets;
- a third determination hardware module to determine an asset work mode according to the identified instruction property from communication traffic among the assets;
- a calculation hardware module to calculate an asset criticality score in a time frame according to the determined asset work mode and the assets role;
- a conduction hardware module to conduct a hardening plan based on the asset criticality score and an asset impact score of hardening the assets for production without affecting the production of the assets in the OT system, wherein the hardening plan includes an update of a program in the assets, an update of the security policy of a password of the assets, an account management of the assets, and a port management of the assets; and
- a fourth determination hardware module to determine whether the assets are abnormal based on monitoring a CPU state, a memory occupancy state, and a communication state of the assets after hardening the assets and to modify the asset impact score of hardening the assets for production in response to the assets being abnormal.

8. An apparatus according to claim 7, further comprising a calculation hardware module to calculate the asset impact score of hardening the assets for production based on whether hardening the assets needs to restart the assets' operating system.

9. An apparatus according to claim 7, further comprising a calculation hardware module to calculate the asset impact score of hardening the assets for production based on duration of hardening the assets.

10. An apparatus according to claim 7, further comprising a calculation hardware module to calculate available hardening time based on the duration of hardening the assets, and based on the asset criticality score, and hardening the assets at the available hardening time.

11. An apparatus according to claim 7, wherein the fourth determination hardware module is to further generate a modified hardening plan.

12. An operational technology (OT) system, comprising:
- at least one processor; and
- a memory, coupled to the at least one processor, that stores instructions executable by the at least one processor, which when executed by the at least one processor, cause the OT system to:
  - collect communication traffic among assets to identify instruction property;
  - determine a status property of the assets according to configuration file of the assets;
  - determine roles for each of the assets according to the identified instruction property and the status property of the assets;
  - determine an asset work mode according to the identified instruction property from communication traffic among the assets;
  - calculate an asset criticality score in a time frame according to the determined asset work mode and the assets role;
  - conduct a hardening plan based on the asset criticality score and an asset impact score of hardening the assets for production without affecting the production of the assets in the OT system, wherein the hardening plan includes an update of a program in the assets, an update of the security policy of a password of the assets, an account management of the assets, and a port management of the assets; and determine whether the assets are abnormal based on monitoring a CPU state, a memory occupancy state, and a communication state of the assets after hardening the assets and to modify the asset impact score of hardening the assets for production in response to the assets being abnormal.

13. The OT system of claim 12, wherein the instructions, which when executed by the at least one processor, further cause the system to calculate the asset impact score of hardening the assets for production based on whether hardening the assets needs to restart the assets' operating system.

14. The OT system of claim 12, wherein the instructions, which when executed by the at least one processor, further cause the system to calculate the asset impact score of hardening the assets for production based on duration of hardening the assets.

15. The OT system of claim 12, wherein the instructions, which when executed by the at least one processor, further cause the system to calculate available hardening time based on the duration of hardening the assets, and based on the asset criticality score, and hardening the assets at the available hardening time.

16. The OT system of claim 12, wherein the instructions, which when executed by the at least one processor, further cause the system to generate a modified hardening plan.

17. The OT system of claim 12, wherein the assets are OT assets; and wherein the OT assets are computer hardware, computer software, or a combination of both.

* * * * *